United States Patent
Mannsperger

(10) Patent No.: US 12,468,320 B2
(45) Date of Patent: Nov. 11, 2025

(54) METHOD FOR THE VALVE CONTROL OF A HYDRAULIC VALVE

(71) Applicant: Schaeffler Technologies AG & Co. KG, Herzogenaurach (DE)

(72) Inventor: Ralf Mannsperger, Renchen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 59 days.

(21) Appl. No.: 18/572,444

(22) PCT Filed: May 4, 2022

(86) PCT No.: PCT/DE2022/100339
§ 371 (c)(1),
(2) Date: Dec. 20, 2023

(87) PCT Pub. No.: WO2023/274440
PCT Pub. Date: Jan. 5, 2023

(65) Prior Publication Data
US 2024/0281008 A1    Aug. 22, 2024

(30) Foreign Application Priority Data
Jun. 30, 2021   (DE) .................. 10 2021 116 782.5

(51) Int. Cl.
*G05D 16/20*      (2006.01)
*F15B 13/044*     (2006.01)
(Continued)

(52) U.S. Cl.
CPC ....... *G05D 16/2013* (2013.01); *F15B 13/044* (2013.01); *F16D 48/02* (2013.01);
(Continued)

(58) Field of Classification Search
CPC .............. G05D 16/2013; F15B 13/044; F16D 2500/3022; F16D 2500/3024;
(Continued)

(56) References Cited

U.S. PATENT DOCUMENTS 5,105,922 A * 4/1992 Yant .................. F16H 61/30
                                                    192/3.58
6,860,830 B2 * 3/2005 Saitou ................ F15B 11/028
                                                    475/116
(Continued)

FOREIGN PATENT DOCUMENTS

DE        10249341 A1    5/2004
DE    102008007269 A1    8/2008
(Continued)

*Primary Examiner* — Minh Q Le
(74) *Attorney, Agent, or Firm* — Price Heneveld LLP

(57) ABSTRACT

A method for valve control of a hydraulic valve which, in an actuation device of a clutch, influences an actuation pressure for actuating the clutch in accordance with an electrical actuation variable that actuates the hydraulic valve. The method includes selectively switching the clutch at least between a first clutch actuation state, in which the actuation pressure has a pressure value in a first actuation pressure range, and a second clutch actuation state, in which the actuation pressure is outside of the first actuation pressure range. The method further includes, during the first clutch actuation state, changing the electrical actuation variable based on the actuation pressure.

18 Claims, 2 Drawing Sheets

(51) Int. Cl.
*F16D 48/02* (2006.01)
*F16H 57/04* (2010.01)
*F16H 61/00* (2006.01)
*F16H 61/02* (2006.01)
*F16H 63/34* (2006.01)

(52) U.S. Cl.
CPC ............... *F16D 2048/0221* (2013.01); *F16D 2500/3022* (2013.01); *F16D 2500/3024* (2013.01); *F16D 2500/3028* (2013.01); *F16H 57/0417* (2013.01); *F16H 57/0441* (2013.01); *F16H 57/0473* (2013.01); *F16H 57/0476* (2013.01); *F16H 61/0021* (2013.01); *F16H 61/0025* (2013.01); *F16H 2061/0037* (2013.01); *F16H 61/0206* (2013.01); *F16H 2061/0209* (2013.01); *F16H 61/0276* (2013.01); *F16H 63/3425* (2013.01); *F16H 63/3483* (2013.01)

(58) Field of Classification Search
CPC ............ F16D 2500/3028; F16D 48/02; F16D 2048/0221; F16H 57/0441; F16H 57/0417; F16H 57/0473; F16H 57/0476; F16H 63/3483; F16H 63/3425; F16H 61/0021; F16H 61/0206; F16H 61/0276; F16H 61/0025; F16H 2061/0037; F16H 2061/0209
USPC .......................................................... 137/14
See application file for complete search history.

(56) References Cited

U.S. PATENT DOCUMENTS

| | | | |
|---|---|---|---|
| 12,018,747 B2 * | 6/2024 | Mannsperger | F16H 61/0025 |
| 2005/0023102 A1 * | 2/2005 | Brissenden | B60K 17/3467 |
| | | | 192/85.63 |
| 2006/0042908 A1 * | 3/2006 | Ronk | F16D 48/066 |
| | | | 192/85.63 |
| 2008/0220917 A1 * | 9/2008 | Grethel | F16H 61/0031 |
| | | | 474/28 |
| 2010/0151992 A1 * | 6/2010 | Kramer | F16H 61/12 |
| | | | 477/86 |
| 2010/0152985 A1 * | 6/2010 | Petzold | F16D 48/066 |
| | | | 701/68 |
| 2013/0213760 A1 * | 8/2013 | Wilson | F16D 25/14 |
| | | | 192/85.63 |
| 2013/0298757 A1 * | 11/2013 | Kramer | F15B 15/20 |
| | | | 91/471 |
| 2014/0373519 A1 * | 12/2014 | Franzoni | F15B 11/024 |
| | | | 60/463 |
| 2015/0136253 A1 * | 5/2015 | Kuwahara | F16D 25/14 |
| | | | 137/596 |
| 2016/0131248 A1 | 5/2016 | Mizuno et al. | |
| 2016/0363177 A1 * | 12/2016 | Samie | F16H 63/3026 |
| 2016/0363215 A1 * | 12/2016 | Köhler | F16D 48/066 |
| 2017/0268587 A1 * | 9/2017 | Ono | F16D 48/066 |
| 2018/0106305 A1 * | 4/2018 | Baehr | F16D 31/00 |
| 2019/0128399 A1 * | 5/2019 | Shin | F16H 61/0031 |
| 2020/0318661 A1 * | 10/2020 | Birk | G05D 19/00 |
| 2021/0332861 A1 * | 10/2021 | Sadakata | F16H 61/0206 |
| 2022/0135020 A1 * | 5/2022 | Mannsperger | B60W 10/023 |
| | | | 701/22 |
| 2023/0151807 A1 * | 5/2023 | Wei | F04B 49/065 |
| | | | 417/1 |
| 2023/0193995 A1 * | 6/2023 | Greb | F16H 63/3458 |
| | | | 192/219.4 |
| 2023/0243422 A1 * | 8/2023 | Greb | F16H 61/0206 |
| | | | 192/219.4 |

FOREIGN PATENT DOCUMENTS

| | | |
|---|---|---|
| DE | 102007024404 A1 | 11/2008 |
| DE | 102018217365 A1 | 4/2020 |
| DE | 102019101468 A1 | 7/2020 |
| EP | 1298360 A2 | 4/2003 |

* cited by examiner

METHOD FOR THE VALVE CONTROL OF A HYDRAULIC VALVE

CROSS-REFERENCE TO RELATED APPLICATIONS

This application is the U.S. National Phase of PCT Appln. No. PCT/DE2022/100339 filed May 4, 2022, which claims priority to DE 102021116782.5 filed Jun. 30, 2021, the entire disclosures of which are incorporated by reference herein.

TECHNICAL FIELD

The present disclosure relates to a method for valve control of a hydraulic valve.

BACKGROUND

In DE 10 2019 101 468 A1, a hydraulic system is described in which a coolant and/or lubricant distribution unit, a clutch actuation unit, a parking lock unit and a switchable reversing pump are arranged, wherein the reversing pump is connected with its first connection to a first line region connected to the coolant and/or lubricant distribution unit and with its second connection to a second line region connected to the clutch actuation unit and the parking lock unit, so that, in a first conveying direction of the reversing pump, a hydraulic medium is pumped into the coolant and/or lubricant distribution unit on the part of the first connection and, in a second conveying direction of the reversing pump, a required pressure for actuating a clutch or the parking lock unit is made available on the part of the second connection. A discharge valve is connected to the second line region coupled to the clutch actuation unit, which can be controlled via power electronics as a shut-off valve for switching between a position in which the second line region is open to a return tank and a position in which the second line region is disconnected from the return tank.

SUMMARY

The present disclosure, according to an exemplary embodiment, reduces energy consumption for actuating a clutch. Furthermore, the clutch is to be operated more cost-effectively and more accurately.

This allows the clutch to be operated in a more energy-efficient manner. A hydraulic valve can maintain an actuation pressure during a first clutch actuation state in a more energy-efficient manner. Valve control can be performed as required depending on the actuation pressure. The hydraulic valve can provide the required hydraulic tightness with the least amount of energy.

The hydraulic valve can be arranged in a hydraulic device. The hydraulic device can be arranged in a vehicle, in particular a motor vehicle. The hydraulic device can be arranged in a hybrid drive train of the vehicle. The hybrid drive train can have at least one electric motor and one internal combustion engine. The hydraulic device can be designed to actuate the clutch, in particular also to actuate a parking lock device and/or to cool and/or lubricate the parking lock device, the electric motor, a transmission and/or the clutch.

The hydraulic device can have a fluid pump for providing hydraulic fluid pressure. The fluid pump can be electrically driven. The fluid pump can be designed as a gear pump. The fluid pump can be controlled electrically by a control unit. The control unit can be connected to a data-transmitting bus system, for example a CAN bus. The control unit can be a drive control unit, in particular for controlling the electric motor and/or the internal combustion engine.

The fluid pump can be designed as a reversing pump and, when rotated in a first direction of rotation, provide fluid pressure to supply actuation pressure and/or actuate the parking lock device and, when rotated in an opposite second direction of rotation, provide fluid flow for cooling and/or lubrication.

The hydraulic device can have at least one switching valve for controlling the fluid pressure to actuate the parking lock and/or to actuate the clutch.

The clutch can be a torque-transmitting separating clutch depending on the clutch actuation. The clutch can be designed as a KO clutch. The clutch can be arranged to transmit torque between the internal combustion engine and the transmission.

The actuation device can have a clutch slave cylinder that is movable by the actuation pressure and switches between the first and second clutch actuation state. The actuation device can be supplied by fluid pressure provided by the fluid pump. A switching valve can be arranged between the actuation device and the fluid pump. The actuation pressure can depend on the fluid pressure due to the valve state of the switching valve.

The hydraulic device can have a check valve operatively arranged between the switching valve and the actuation device. The check valve can be used to maintain an actuation pressure in the actuation device even when the fluid pump is shut off and/or the switching valve is not actuated. The check valve can prevent a reduction in actuation pressure.

The hydraulic valve can be electromagnetically actuated. The hydraulic valve can have an electromagnet controlled by the electrical actuation variable. The hydraulic valve can be operatively arranged between the actuation device and a fluid reservoir for diverting the fluid in the actuation device.

In embodiments of the present disclosure, it is advantageous if a lower pressure value and an upper pressure value are defined within the actuation pressure range, depending on which the electrical actuation variable is changed. When at least one of the two pressure values is reached during the first clutch actuation state, a change in the electrical actuation variable is initiated.

The electrical actuation variable can alternatively or additionally be changed depending on a time-based pressure gradient of the actuation pressure during the first clutch actuation state. The greater the pressure gradient, the greater the absolute value of the electrical actuation variable can be.

The electrical actuation variable can be increased if the actuation pressure is increased during the first clutch actuation state.

In embodiments, it is advantageous if during the first clutch actuation state, when the lower pressure value is reached, the absolute value of the electrical actuation variable is increased. The absolute value of the electrical actuation variable can be increased when the lower pressure value is reached starting from lower or higher pressure values of the actuation pressure.

In embodiments, it is advantageous if during the first clutch actuation state, when the upper pressure value is reached, the absolute value of the electrical actuation variable is reduced. The absolute value of the electrical actuation variable can be reduced when the upper pressure value is reached starting from lower or higher pressure values of the actuation pressure.

In embodiments, it is provided that the electrical actuation variable is an electric current or an electric voltage. The electric current or electric voltage can actuate an electromagnetic actuator on the hydraulic valve in order to influence the actuation pressure. When an electric current or electric voltage is applied, the hydraulic valve can be closed while maintaining the actuation pressure for the first clutch actuation state as far as possible.

In embodiments, the clutch is engaged for torque transmission in the first clutch actuation state and is disengaged for interruption of torque transmission in the second clutch actuation state. In the first clutch actuation state, the hydraulic valve can be closed by the electrical actuation variable. In the second clutch actuation state, the hydraulic valve can be open. This allows the actuation pressure to be lowered, preferably to zero. At an actuation pressure of zero, the clutch can be disengaged. The absolute value of the electrical actuation variable with the hydraulic valve closed can be greater than that with the hydraulic valve open.

In embodiments, it is advantageous if during the first clutch actuation state, a re-pumping process is performed to increase the actuation pressure within the first actuation pressure range, wherein the absolute value of the electrical actuation variable is set to be greater during the re-pumping process than outside of the re-pumping process. This allows the hydraulic tightness of the hydraulic valve to be adjusted during the re-pumping process.

The re-pumping process can be triggered when the actuation pressure reaches the lower pressure value or other specified pressure value within the first actuation pressure range during the first clutch actuation state, starting from higher pressure values.

In embodiments, it is provided that a hydraulic tightness of the hydraulic valve influencing the actuation pressure at least during the first clutch actuation state depends on the electrical actuation variable. In the first clutch actuation state, leaks at the hydraulic valve can cause a pressure reduction of the actuation pressure in the actuation device, even when the hydraulic valve was supposed to maintain the actuation pressure.

In embodiments, it is advantageous if the greater the absolute value of the electrical actuation variable is, the greater the hydraulic tightness of the hydraulic valve is in the first clutch actuation state. The relationship between the hydraulic tightness and the electrical actuation variable can be linear or nonlinear.

In embodiments, it is advantageous if the hydraulic valve is a discharge valve, which is closed in the first clutch actuation state and open in the second clutch actuation state in order to reduce the actuation pressure. The hydraulic valve can be hydraulically operatively arranged between the actuation device and a fluid reservoir. The open discharge valve can cause a pressure reduction of the actuation pressure by draining the fluid into the fluid reservoir.

Further advantages and advantageous embodiments of the present disclosure result from the description of the figures and the drawings.

BRIEF DESCRIPTION OF THE DRAWINGS

The present disclosure is described in detail below with reference to the drawings. In the figures.

DETAILED DESCRIPTION

Figure 1:
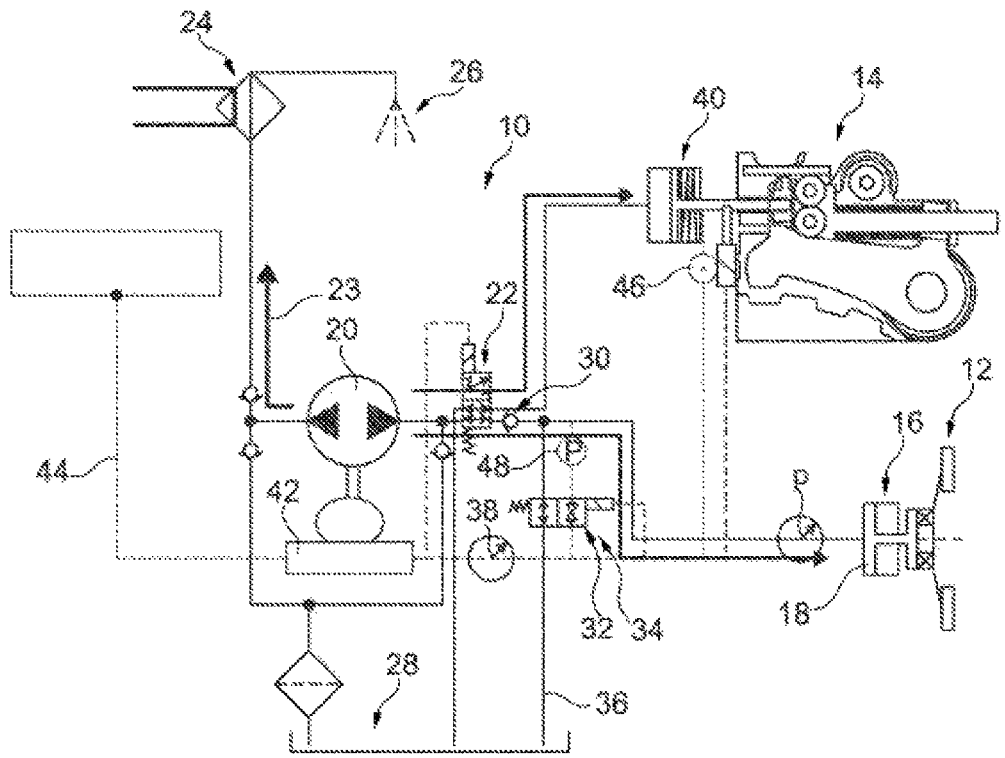
FIG. 1: shows a hydraulic device having a hydraulic valve for carrying out a method of an exemplary embodiment of the present disclosure.

FIG. 1 shows a hydraulic device 10 having a hydraulic valve for carrying out a method of an exemplary embodiment of the present disclosure. The hydraulic device 10 is arranged in a vehicle, for example, and is designed to control a clutch 12 capable of transmitting torque between an internal combustion engine and a transmission, and to control a parking lock device 14 for limiting movement of the vehicle when the vehicle is in a parked position. The clutch 12 can be designed as a K0 clutch.

The clutch 12 is actuated depending on an actuation pressure p of a fluid in an actuation device 16. A clutch slave cylinder 18 is arranged for this purpose, which exerts a contact pressure on the clutch 12 as a function of the actuation pressure p and thereby, at an actuation pressure p with a pressure value within a first actuation pressure range, sets a first clutch actuation state corresponding to an engaged clutch 12 for transmitting torque.

The actuation pressure p is controlled by a fluid pressure of a fluid pump 20, which may be designed as a gear pump, and a switching valve 22. The fluid pump 20 may be a reversing pump which, when rotated in a first direction of rotation, provides the fluid pressure which causes the actuation pressure p via the switching valve 22 and, when rotated in an opposite second direction of rotation, provides a fluid flow 23 for cooling and/or lubricating the clutch 12, the parking lock device 14, the transmission or other components in the vehicle, for example an electric motor, via a heat exchanger 24 to a cooling device 26.

The fluid pump 20 is connected to a fluid reservoir 28 that accommodates the fluid. When the fluid pump 20 is rotated in the first direction of rotation, fluid is conveyed from the fluid reservoir 28 and directed through a hydraulic connection between the fluid pump 20 and the actuation device 16 to build up the actuation pressure p in order to set the first clutch actuation state. The switching valve 22 is operatively arranged between the fluid pump 20 and the actuation device 16, and allows for control of the actuation pressure p in the actuation device 16.

If the clutch 12 is actuated starting from a second clutch actuation state in which the actuation pressure p is zero, for example, and thereby the clutch slave cylinder 18 is unloaded by the actuation pressure p and thus, in turn, the clutch 12 is disengaged and torque transmission is interrupted, by increasing the fluid pressure and the switching valve 22 being open via the actuation pressure p increasing therewith and the clutch slave cylinder 18 being pressurized therewith, a check valve 30 operatively arranged between the switching valve 22 and the actuation device 16 prevents a pressure drop of the actuation pressure p irrespective of the actuation of the switching valve 22. In this manner, the energy consumption for maintaining the actuation pressure p can be reduced.

A hydraulic valve 32 is operatively arranged between the actuation device 16 and the fluid reservoir 28 and is designed as a discharge valve 34. The discharge valve 34 can be used to trigger a drop in the actuation pressure p via a return line 36, which is arranged between the discharge valve 34 and the fluid reservoir 28. The discharge valve 34 can be actuated by an electrical actuation variable 38, such as an electric current or electric voltage. For this purpose, the hydraulic valve 32 has an electromagnet that sets a valve position depending on the electrical actuation variable 38.

The switching valve 22 is designed as a two-way valve that builds up the fluid pressure provided by the fluid pump 20 as actuation pressure p or as actuation pressure for actuating the parking lock device 14 via a parking lock actuator 40, depending on a switching position. The switching valve 22, the parking lock actuator 40, and the hydraulic valve 32 are electrically connected to a control unit 42. The control unit 42 is electrically connected to a bus system 44 of the vehicle, for example a CAN bus. The parking lock device 14 has a displacement sensor 46, via which the information about the actuation position of the parking lock device 14 is acquired. The actuation pressure p is acquired by a pressure sensor 48.

Due to leaks, for example, in the switching valve 22, the actuation device 16 and/or the hydraulic valve 32, a drop in the actuation pressure p within the first actuation pressure range can occur in the first clutch actuation state, corresponding to an engaged clutch 12, which can be built up by a re-pumping process via the fluid pump 20 moved in the first direction of rotation and the resulting increase in fluid pressure with a suitable valve position of the switching valve 22. During the re-pumping process and the continued first clutch actuation state, the electrical actuation variable 38 for actuating the hydraulic valve 32 is changed depending on the actuation pressure p. The absolute amount of the electrical actuation variable 38 is set to be greater during the re-pumping process than outside of the re-pumping process. In this way, the requirement for hydraulic tightness of the hydraulic valve 32, which increases with increasing actuation pressure p, can be satisfied.

The greater the electrical actuation variable 38, the greater the hydraulic tightness of the hydraulic valve 32. By increasing the electrical actuation variable 38 during the re-pumping process, the hydraulic tightness of the hydraulic valve 32 can increase and thus the actuation pressure p can be built up more quickly and in a more energy-efficient manner. Once the re-pumping process is complete, the electrical actuation variable 38 can be reset to a lower value during the first clutch actuation state, thereby reducing the energy consumption required to actuate the hydraulic valve 32.

Figure 2:
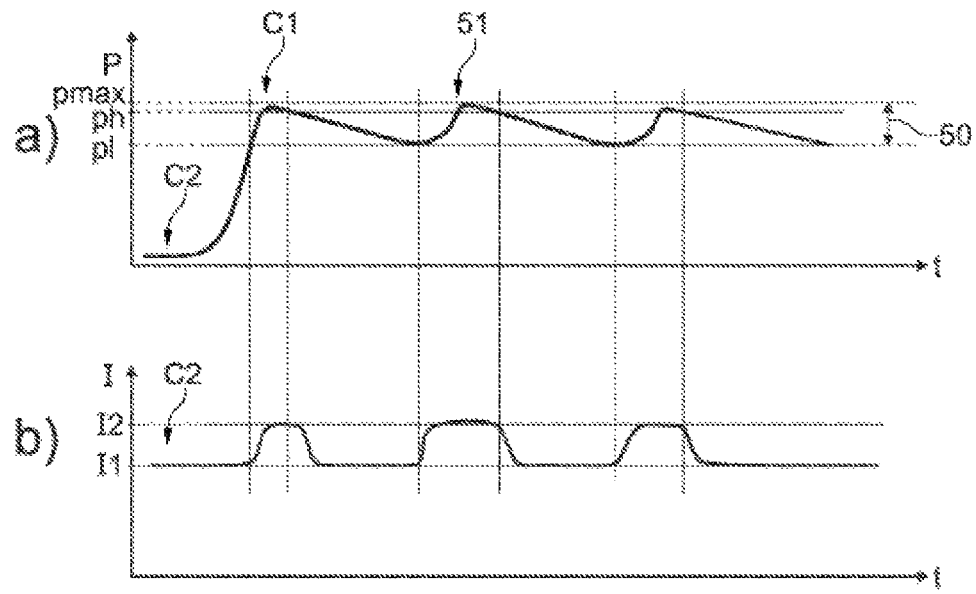
FIG. 2: shows a course over time of an actuation pressure and an electrical actuation variable when carrying out a method of the exemplary embodiment of the present disclosure.

FIG. 2 shows a course over time of an actuation pressure and an electrical actuation variable when carrying out a method of the exemplary embodiment of the present disclosure. FIG. 2 a) shows a course over time of the actuation pressure p and FIG. 2 b) shows a course over time of the electrical actuation variable, in this case the electric current I for actuating the hydraulic valve 32. If the clutch 12 is switched from the second clutch actuation state C2, in which the actuation pressure p is approximately zero and the electric current I has a first current value I1, to the first clutch actuation state C1, the actuation pressure p is increased.

When the actuation pressure p reaches a predetermined lower pressure value pl within the first actuation pressure range 50 present in the first clutch actuation state C1, the electric current I is increased to a second current value I2 in order to actuate the hydraulic valve 32 designed as a discharge valve 34.

The pressure build-up of the actuation pressure p is terminated as soon as the actuation pressure p reaches a predetermined maximum pressure value pmax. The clutch 12 is still in the first clutch actuation state C1 and is engaged. The actuation pressure p slowly decreases due to leakage. As soon as a predetermined upper pressure value ph is reached within the first actuation pressure range 50, starting from a higher pressure value, the electric current I is switched to the first current value I1. Only when the actuation pressure p reaches the lower pressure value pl, starting from higher pressure values, is the electric current I for actuating the hydraulic valve raised again to the second current value I2 and the re-pumping process 51 is also initiated, which causes the actuation pressure p to be raised up to the maximum pressure value pmax via the fluid pump 20. The fluid pump 20 stops further pressure delivery when the maximum pressure value pmax is reached.

During the re-pumping process, the electric current I assumes the second current value I2 in order to increase the hydraulic tightness of the hydraulic valve 32 during the re-pumping process 51. Only when the actuation pressure p reaches the upper pressure value ph, starting from the maximum pressure value pmax, is the lower first current value I1 set, thereby reducing the energy consumption required to actuate the hydraulic valve 32.

Figure 3:
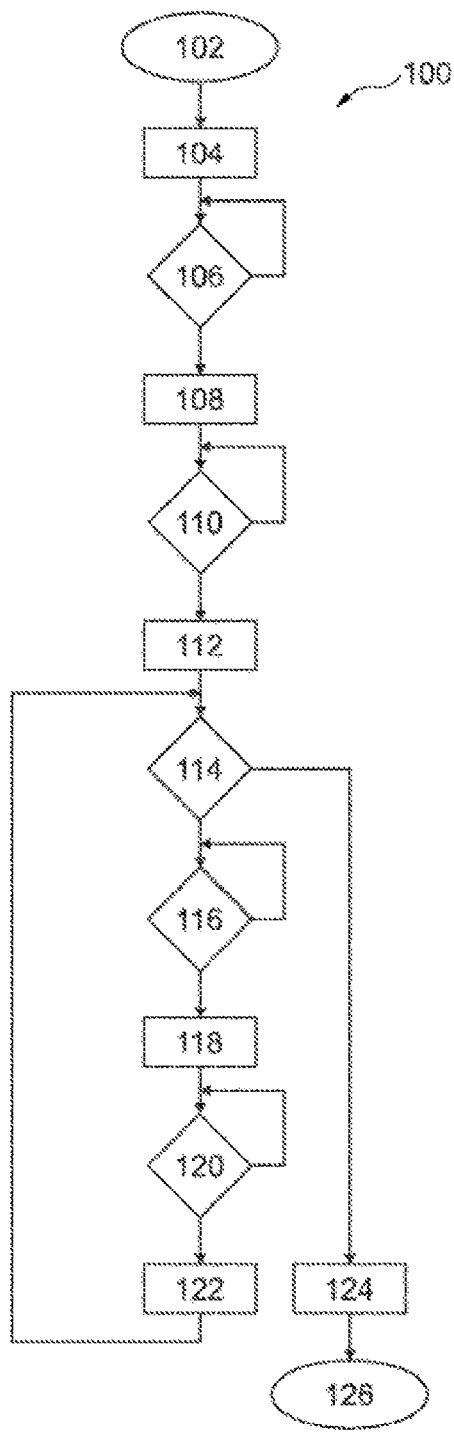
FIG. 3: shows a flow chart of a method of the exemplary embodiment of the present disclosure.

FIG. 3 shows a flow chart of a method of the exemplary embodiment of the present disclosure. The method 100 for the valve control of the hydraulic valve 32 begins with an introduction step 102, followed by an initialization 104. A subsequent query 106 is directed to whether the clutch 12 should assume the first clutch actuation state C1, i.e., be engaged in order to transmit torque. Only when the changeover is to take place is the discharge valve 34 actuated in a subsequent step 108 by setting the electrical actuation variable to the higher second current value I2.

Depending on a subsequent query 110 as to whether the actuation pressure p reaches the predetermined upper pressure value ph, starting from higher pressure values, the electric current I is reduced to the first current value I1 in a subsequent step 112 if the query 110 is returned as true. A subsequent query 114 checks whether the clutch 12 should maintain the first clutch actuation state C1, and if so, a further query 116 checks the need for a re-pumping process 51 in order to increase the actuation pressure p. Depending on the actuation pressure p lying within the first actuation pressure range, the re-pumping process 51 is initiated if necessary, for example when the actuation pressure p reaches the lower pressure value pl starting from higher pressure values.

If a re-pumping process 51 is to occur, together with initiation of the re-pumping process 51, in a subsequent step 118 the electric current I is increased to the second current value I2 and then a query 120 is performed in accordance with the query 110. If the actuation pressure p reaches the lower pressure value pl starting from higher pressure values. the electric current I is reduced to the first current value I1 in a subsequent step 122, thus actuating the discharge valve 34 in a more energy-efficient manner. Then the sequence starts again with the query 114.

If the clutch 12 is to be disengaged during the query 114, thereby switching the first clutch actuation state C1 to the second clutch actuation state C2, the electric current I is reduced to zero in a subsequent step 124, thereby opening the discharge valve 34 in order to relieve the actuation pressure p for disengaging the clutch 12. The method 100 is terminated by a finalizing step 126.

LIST OF REFERENCE SYMBOLS

10 Hydraulic device
12 Clutch
14 Parking lock device
16 Actuation device
18 Clutch slave cylinder
20 Fluid pump
22 Switching valve
23 Fluid flow 24 Heat exchanger
26 Cooling device
28 Fluid reservoir
30 Check valve
32 Hydraulic valve
34 Discharge valve
36 Return line
38 Electrical actuation variable
40 Parking lock actuator
42 Control unit
44 Bus system
46 Displacement sensor
48 Pressure sensor
50 First actuation pressure range
51 Re-pumping process
100 Method
102 Introduction step
104 Initialization
106 Query
108 Step
110 Query
112 Step
114 Query
116 Query
118 Step
120 Query
122 Step
124 Step
126 Finalizing step
C1 First clutch actuation state
C2 Second clutch actuation state
I Electric current
I1 First current value
I2 Second current value
P Actuation pressure
ph Upper pressure value
pl Lower pressure value
pmax Maximum pressure value

The invention claimed is:

1. A method for valve control of a hydraulic valve which, in an actuation device of a clutch, influences an actuation pressure for actuating the clutch in accordance with an electrical actuation variable that actuates the hydraulic valve, the method comprising:
selectively switching the clutch-at least between a first clutch actuation state, in which the actuation pressure has a pressure value in a first actuation pressure range, and a second clutch actuation state, in which the actuation pressure outside of the first actuation pressure range,
during the first clutch actuation state, changing the electrical actuation variable based on the actuation pressure, wherein a lower pressure value and an upper pressure value are defined within the first actuation pressure range based on the electrical actuation variable, and
during the first clutch actuation state, at least one of:
when the lower pressure value is reached, increasing an absolute value of the electrical actuation variable, and
when the upper pressure value is reached, reducing an absolute value of the electrical actuation variable.

2. The method according to claim 1, further comprising, during the first clutch actuation state, when the lower pressure value is reached, increasing an absolute value of the electrical actuation variable.

3. The method according to claim 1, further comprising, during the first clutch actuation state, when the upper pressure value is reached, reducing an absolute value of the electrical actuation variable.

4. The method according to claim 1, wherein the electrical actuation variable is an electric current or an electric voltage.

5. The method according to claim 1, wherein the clutch is engaged for torque transmission in the first clutch actuation state and is disengaged for interruption of torque transmission in the second clutch actuation state.

6. The method according to claim 1, further comprising, during the first clutch actuation state, performing a re-pumping process to increase the actuation pressure within the first actuation pressure range, wherein an absolute value of the electrical actuation variable is set to be greater during the re-pumping process than outside of the re-pumping process.

7. The method according to claim 1, wherein a hydraulic tightness of the hydraulic valve influencing the actuation pressure at least during the first clutch actuation state depends on the electrical actuation variable.

8. The method according to claim 7, wherein the hydraulic tightness of the hydraulic valve in the first clutch actuation state increases as an absolute value of the electrical actuation variable increases.

9. The method according to claim 1, wherein the hydraulic valve is a discharge valve, which is closed in the first clutch actuation state and open in the second clutch actuation state in order to reduce the actuation pressure.

10. A hydraulic device, comprising:
a pump;
a clutch having an actuation device configured to switch the clutch at least between a first clutch actuation state and a second clutch actuation state; and
a hydraulic valve arranged between the pump and the actuation device and actuatable via an electrical actuation variable, the hydraulic valve configured to influence an actuation pressure of the actuation device;
wherein, in the first clutch actuation state, the actuation pressure of the actuation device has a first value that is within actuation pressure range, and, in the second clutch actuation state, the actuation pressure of the actuation device has a second value that is less than the first value;
wherein, in the first clutch actuation state, the hydraulic valve is actuated, via a change in the electrical actuation variable, based on the first value, and wherein the hydraulic valve is a discharge valve, which is closed in the first clutch actuation state and open in the second clutch actuation state in order to reduce the actuation pressure.

11. The hydraulic device according to claim 10, wherein the clutch is engaged for torque transmission in the first clutch actuation state and is disengaged for interruption of torque transmission in the second clutch actuation state.

12. The hydraulic device according to claim 11, wherein, during actuation of the clutch from second clutch actuation state to the first clutch actuation state, the electrical actuation variable is increased in response to the first value of the actuation pressure increasing to a lower pressure value of the actuation pressure range.

13. The hydraulic device according to claim 12, wherein, after the first value reaches an upper pressure value of the actuation pressure range, the electrical actuation variable is reduced in response to the first value decreasing to a threshold value.

14. The hydraulic device according to claim 13, wherein the upper pressure value is greater than the lower pressure value.

15. The hydraulic device according to claim 13, wherein the threshold value is between the lower pressure value and the upper pressure value.

16. The hydraulic device according to claim 13, wherein, in the first clutch actuation state, in response to the first value decreasing to the lower pressure value:
   the pump is actuated to increase the actuation pressure; and
   the electrical actuation variable is increased.

17. The hydraulic device according to claim 16, wherein the pump is stopped in response to the first value reaching the upper pressure value.

18. The hydraulic device according to claim 16, wherein the electrical actuation variable is reduced in response to the first value decreasing to the threshold value.

* * * * *